(12) United States Patent
Tullman

(10) Patent No.: US 11,467,582 B2
(45) Date of Patent: Oct. 11, 2022

(54) SYSTEMS AND METHODS FOR AN AUTONOMOUS MARKING APPARATUS

(71) Applicant: USIC, LLC, Indianapolis, IN (US)

(72) Inventor: Robert Tullman, Indianapolis, IN (US)

(73) Assignee: USIC, LLC, Indianapolis, IN (US)

( * ) Notice: Subject to any disclaimer, the term of this patent is extended or adjusted under 35 U.S.C. 154(b) by 343 days.

(21) Appl. No.: 16/674,751

(22) Filed: Nov. 5, 2019

(65) Prior Publication Data
US 2020/0142414 A1    May 7, 2020

Related U.S. Application Data

(60) Provisional application No. 62/755,876, filed on Nov. 5, 2018, provisional application No. 62/755,883, filed
(Continued)

(51) Int. Cl.
*G05D 1/00* (2006.01)
*G05D 1/10* (2006.01)
(Continued)

(52) U.S. Cl.
CPC ......... *G05D 1/0094* (2013.01); *B64C 39/024* (2013.01); *B64D 1/18* (2013.01);
(Continued)

(58) Field of Classification Search
CPC .. G05D 1/0094; G05D 1/0088; G05D 1/0276; G05D 1/101; G05D 16/028;
(Continued)

(56) References Cited

U.S. PATENT DOCUMENTS

| 5,883,815 A * | 3/1999 | Drakulich | G01M 3/002 |
| | | | 702/51 |
| 7,739,899 B1 * | 6/2010 | Holland | G01M 3/24 |
| | | | 73/40.5 R |

(Continued)

FOREIGN PATENT DOCUMENTS

| DE | 102015008086 A1 | 12/2016 |
| DE | 2015008068 B4 | 5/2018 |

(Continued)

OTHER PUBLICATIONS

International Search Report and Written Opinion dated Jan. 16, 2020, Application No. PCT/US2019/059863 (19 pages).
(Continued)

*Primary Examiner* — Yonel Beaulieu
(74) *Attorney, Agent, or Firm* — Burns & Levinson LLP; Christopher Carroll

(57) ABSTRACT

An autonomous marking apparatus comprising a propulsion system, a location sensor, a payload assembly, one or more marking sensors, a transceiver, a data store, and a processor. The location sensor is arranged to determine the location of the apparatus. The payload assembly is arranged to carry a payload of marking material. The one or more marking sensors are arranged to scan an area in proximity to the apparatus. The transceiver is arranged to exchange data with a remote server via a data network. The data store is arranged to store a portion of the data. The processor is arranged to receive data from the location sensor, the one or more marking sensors, and from the transceiver. The processor is also arranged to send data to the transceiver and control the delivery of the payload at the location of the apparatus.

20 Claims, 9 Drawing Sheets

Related U.S. Application Data on Nov. 5, 2018, provisional application No. 62/755,877, filed on Nov. 5, 2018.

(51) Int. Cl.

| | |
|---|---|
| *G05D 1/02* | (2020.01) |
| *B64C 39/02* | (2006.01) |
| *B64D 47/08* | (2006.01) |
| *B64D 1/18* | (2006.01) |
| *H04W 4/40* | (2018.01) |
| *B64D 9/00* | (2006.01) |
| *G01V 15/00* | (2006.01) |
| *H04W 4/38* | (2018.01) |
| *H04W 4/029* | (2018.01) |
| *G06F 16/28* | (2019.01) |
| *G06F 16/29* | (2019.01) |
| *G08G 5/00* | (2006.01) |
| *G06V 20/13* | (2022.01) |
| *H04W 84/18* | (2009.01) |

(52) U.S. Cl.
CPC ............ *B64D 9/00* (2013.01); *B64D 47/08* (2013.01); *G01V 15/00* (2013.01); *G05D 1/0088* (2013.01); *G05D 1/0276* (2013.01); *G05D 1/101* (2013.01); *G06F 16/285* (2019.01); *G06F 16/29* (2019.01); *G06V 20/13* (2022.01); *G08G 5/0069* (2013.01); *H04W 4/029* (2018.02); *H04W 4/38* (2018.02); *H04W 4/40* (2018.02); *B64C 2201/027* (2013.01); *B64C 2201/12* (2013.01); *B64C 2201/123* (2013.01); *B64C 2201/127* (2013.01); *B64C 2201/141* (2013.01); *B64C 2201/145* (2013.01); *B64C 2201/146* (2013.01); *H04W 84/18* (2013.01)

(58) Field of Classification Search
CPC ............ G05D 16/2073; B64C 39/024; B64C 2201/027; B64C 2201/12; B64C 2201/123; B64C 2201/127; B64C 2201/141; B64C 2201/146; B64C 2201/14; B64D 1/18; B64D 9/00; B64D 47/08; G01V 15/00; G01V 3/16; G06F 16/285; G06F 16/29; G06V 20/13; G06V 10/245; G08G 5/0069; H04W 4/029; H04W 4/38; H04W 4/40; H04W 84/18
See application file for complete search history.

(56) References Cited

U.S. PATENT DOCUMENTS

| | | | |
|---|---|---|---|
| 9,542,863 B2 | 1/2017 | Nielsen et al. | |
| 9,702,830 B1 | 7/2017 | Akselrod et al. | |
| 10,831,199 B2 | 11/2020 | Anderson | |
| 10,841,744 B2* | 11/2020 | Patil | H04W 84/005 |
| 10,866,597 B1* | 12/2020 | Reinhold | B64C 39/024 |
| 11,059,582 B2* | 7/2021 | Nahuel-Andrejuk | G05D 1/101 |
| 11,125,910 B2* | 9/2021 | Starr | G01V 8/005 |
| 11,265,538 B2 | 3/2022 | Esenlik et al. | |
| 2007/0042123 A1 | 2/2007 | Endregaard et al. | |
| 2008/0218170 A1* | 9/2008 | Stolarczyk | G01V 3/17 324/330 |
| 2009/0167308 A1* | 7/2009 | Lomes | G01V 3/081 324/326 |
| 2010/0194641 A1* | 8/2010 | Miller | G01S 11/04 342/417 |
| 2011/0063767 A1* | 3/2011 | Kasztenny | H02H 3/28 361/66 |
| 2012/0210853 A1* | 8/2012 | Abershitz | B64F 1/04 89/1.11 |
| 2012/0229321 A1* | 9/2012 | Holly | G01V 3/17 342/22 |
| 2013/0265138 A1 | 10/2013 | Nielsen et al. | |
| 2014/0297225 A1* | 10/2014 | Petroski | G01D 9/28 702/188 |
| 2015/0330911 A1 | 11/2015 | Howard | |
| 2016/0350907 A1 | 12/2016 | Simula et al. | |
| 2017/0031369 A1 | 2/2017 | Liu et al. | |
| 2017/0102467 A1 | 4/2017 | Nielsen et al. | |
| 2017/0108609 A1* | 4/2017 | Haddy | G08G 5/0069 |
| 2017/0323129 A1 | 11/2017 | Davidson et al. | |
| 2017/0363764 A1 | 12/2017 | Aldridge et al. | |
| 2018/0156614 A1 | 6/2018 | Michini et al. | |
| 2018/0196135 A1 | 7/2018 | Crain et al. | |
| 2018/0259652 A1 | 9/2018 | Shimizu et al. | |
| 2018/0306923 A1 | 10/2018 | Porcel Magnusson | |
| 2019/0087635 A1* | 3/2019 | Klaus | B64D 47/08 |
| 2019/0187724 A1 | 6/2019 | Li et al. | |
| 2019/0259150 A1 | 8/2019 | High et al. | |
| 2019/0317239 A1* | 10/2019 | Olsson | G01C 21/32 |
| 2019/0354742 A1 | 11/2019 | Murakoshi | |
| 2020/0012829 A1 | 1/2020 | Davidson et al. | |
| 2020/0065605 A1 | 2/2020 | Manako et al. | |
| 2020/0066142 A1 | 2/2020 | Fowe et al. | |
| 2020/0072624 A1* | 3/2020 | Kuzmanovic | G01C 21/3691 |
| 2020/0111222 A1 | 4/2020 | Asmari et al. | |
| 2020/0115050 A1 | 4/2020 | Murakoshi | |
| 2020/0158910 A1 | 5/2020 | Tietsworth et al. | |
| 2021/0013705 A1* | 1/2021 | Miron | B64D 1/22 |
| 2021/0061465 A1 | 3/2021 | Kaneda | |
| 2021/0231518 A1* | 7/2021 | Pawlyk | G01M 3/20 |
| 2021/0278314 A1* | 9/2021 | Xia | G01M 7/00 |
| 2021/0284335 A1* | 9/2021 | McLaughlin | B64F 1/362 |
| 2021/0309352 A1* | 10/2021 | Elkins | G01S 13/885 |
| 2021/0391653 A1* | 12/2021 | Berg | H04B 3/52 |
| 2021/0405244 A1* | 12/2021 | Starr | G01S 7/412 |

FOREIGN PATENT DOCUMENTS

| | | |
|---|---|---|
| DE | 102018121401 A1 | 3/2020 |
| EP | 2805229 B1 | 5/2020 |

OTHER PUBLICATIONS

International Search Report and Written Opinion dated Jan. 21, 2020, Application No. PCT/US2019/059858 (19 pages).
International Search Report and Written Opinion dated Jan. 21, 2020, Application No. PCT/US2019/059862 (20 pages).
Machine Translation of Korean Patent Application Pub No. KR101786494B1 that was filed in 2017 (downloaded Mar. 7, 2022).

* cited by examiner

| Color | Pigment(s) |
|---|---|
| Black | Carbon |
| Blue | Cobalt Aluminate, Cobalt Stannate |
| Green | Chromium Oxide |
| White | Titanium Dioxide, Antimony Trioxide, Zinc Oxide |
| Yellow | Cadmium Sulfide, Lead Chromate, Zinc Chromate |
| Orange | Cadmium Sulfi Selenide |
| Red | Iron Oxide, Cadmium Selenide |
| Violet | Cobalt Phosphate |

FIG. 6

SYSTEMS AND METHODS FOR AN AUTONOMOUS MARKING APPARATUS

REFERENCE TO RELATED APPLICATIONS

This application claims priority to and the benefit of: U.S. Provisional Patent Application No. 62/755,876, filed on Nov. 5, 2018, and entitled "Systems and Methods for an Autonomous Marking Apparatus"; U.S. Provisional Patent Application No. 62/755,883, filed on Nov. 5, 2018, and entitled "Systems and Methods for Autonomous Marking Maintenance"; and U.S. Provisional Patent Application No. 62/755,887, filed on Nov. 5, 2018, and entitled "Systems and Methods for Autonomous Marking Identification." The entire contents of the above-referenced applications are incorporated herein by reference.

FIELD OF THE INVENTION

The invention relates generally to systems and methods for operating an autonomous apparatus. More particularly, in various aspects, the invention relates to locating and marking locations associated with underground infrastructure using an autonomous apparatus.

BACKGROUND

Often, public utility lines are run underground due to their function, to limit obstruction of other infrastructure, or for convenience. Examples of underground utility lines include electric power, natural gas, communications, potable water, reclaimed water, and wastewater, among others. As required by law and assigned by the U.S. Federal Communications Commission (FCC), the 8-1-1 telephone number is used as a hotline that allows developers and homeowners to contact utility companies, who will then denote where underground utilities are located using color-coded markings.

Typically, utility companies deploy contractors to detect and identify the location and depth of the utility lines using a utility locator tool. After detection and identification, the utility lines are marked with paint. Such a process is considered labor-intensive and inefficient, often requiring extensive amounts of man-hours of work. Accordingly, there is a need to enable more efficient utility detection and markings. Furthermore, the problem is exacerbated when utility lines need to be marked across a large area (e.g., along a highway) where traditional human marking of the utility lines can be onerous. Hence, there is a long felt need to address the challenges of marking utility lines across a vast area in a more efficient manner. Another problem with utility markings is that such markings may be obscured, covered, or removed during a construction project, requiring contractors to perform multiple surveys of an area that often leads to costly re-identification and re-marking of utility lines. Accordingly, there is also a need enable more efficient and reliable tracking, monitoring, and re-marking of utility lines.

SUMMARY OF INVENTION

The present disclosure describes systems, methods, and devices that enable more efficient identification and marking of certain infrastructure, including underground utilities. In certain aspects, an aerial drone or robot may be deployed within a geographic area or worksite to scan and detect the markings associated with underground infrastructure. The drone may operate autonomously, under the control of a user, or cooperatively with a contractor as the contractor detects and marks the location of certain underground infrastructure. In some aspects, the drone may include detection equipment that enables the drone to autonomously detect certain underground infrastructure. The drone may include a payload of marking material and a delivery mechanism to deliver markings to a surface. The delivery mechanism may include a spray head arranged to deliver a marking material such as paint to a surface at a location corresponding to an infrastructure component. The drone may include a computer processor and navigation system that enables the drone to move to a location or set of locations corresponding to underground infrastructure and/or markings. The drone may include one or more marking sensors that enable the drone to sense and/or detect the present of one or more markings within the vicinity of the drone. The drone may include a communications system that enables the drone to exchange data, including marking identification and/or location data with a remotely located server and/or marking database. The drone may utilize marking location data stored within the marking database to enable the drone to navigate to one or more marking locations within a worksite or geographic area. The drone may be configured to recognize marking at one or more locations and transmit such marking identification and/or location data to the markings database. A drone may be configured to store a portion of the marking data-based within its memory and/or local data store.

In one aspect, the present disclosure relates to an autonomous marking apparatus including a transceiver communicatively coupled to a data network and/or a ground-penetrating sensor. The transceiver may be arranged to receive underground infrastructure data from the data network and/or ground-penetrating sensor. The underground infrastructure data may include location and type data associated with underground infrastructure. The ground-penetrating sensor may connected to or integrated within the apparatus. Alternatively, the ground-penetrating sensor may be detached from and/or not physically connected to the apparatus. The apparatus also includes a location sensor arranged to determine the location of the apparatus, a payload assembly arranged to carry a payload of marking material, and a data store arranged to store the underground infrastructure data. The apparatus also includes an processor and/or controller arranged to: i) receive apparatus location data from the location sensor, ii) receive the underground infrastructure data from the data store, iii) control the location of the apparatus by sending propulsion instructions to the propulsion system, and v) control the delivery of the payload at the location of the underground infrastructure based, in part, on the apparatus location data and the underground infrastructure data. The processor may be arranged to control the delivery of the payload at the location of the underground infrastructure based, in part, on the apparatus location data and the underground infrastructure data. For example, the processor and/or controller may continuously compare the location of the marking apparatus with the location of an underground infrastructure element designated for marking in the underground infrastructure data while the marking apparatus is moving. The processor may continuously compare the difference in, for example, GPS coordinates of the marking apparatus with the target underground infrastructure GPS coordinates, and control the propulsion system so as to navigate the marking apparatus to the GPS coordinates of the underground infrastructure designated for marking. Once at the target location, the marking apparatus may mark the surface above the underground infrastructure designated for marking based on the type of underground infrastructure.

In some implementations, the apparatus includes one or more of a robot, drone, unmanned aerial vehicle (UAV), and an autonomous aerial vehicle (AAV).

In certain implementations, the marking material includes one or more of paint, flags, electronic beacons, and marking structures. In some implementations, the payload includes one or more optically-identifiable elements.

In other implementations, the apparatus includes one or more marking sensors that may include one or more of optical sensors, visible light sensors, cameras, infrared sensors, ultra violet sensors, and radiation sensors.

According to some implementations, the location sensor includes at least one of a GPS sensor, an accelerometer, telemetry sensor, radio-frequency sensor, and radio-frequency triangulation sensor.

In some implementations, the data store stores location data including one or more locations and infrastructure types associated with an underground infrastructure. In certain implementations, the underground infrastructure includes at least one of a water pipe, a gas pipe, an electrical cable, a fiber optic cable, a communication cable, a liquid pipe, a structure, a tunnel, an electrical unit, and electronics unit.

In other implementations, the data network includes a wireless data network. In certain implementations, the wireless data network includes at least one of a mobile telephone network, a Wi-Fi network, a local area network, a wide area network, the Internet, a Bluetooth network, and other wireless network.

The transceiver may be configured to directly or indirectly exchange underground infrastructure data with a ground-penetrating sensor. In certain implementations, the processor is arranged to process the underground infrastructure data and location data from the location sensor and store a table including correlated underground infrastructure and location data in the data store.

In some implementations, the apparatus includes a payload delivery unit arranged to deploy a portion of the payload in response to an instruction from the processor. In certain implementations, the payload delivery unit includes at least one or more of spray nozzles, pneumatic dispensers, mechanical dispensers, and electronic dispensers.

Another aspect includes a method for autonomous marking including: A method for autonomous marking including: communicatively coupling a marking apparatus to at least one of a data network and a ground-penetrating sensor; receiving underground infrastructure data from the at least one of the data network and the ground-penetrating sensor, wherein the underground infrastructure data includes location and type data associated with underground infrastructure; positioning a marking apparatus using a propulsion system; determining a location of the apparatus via a location sensor; receiving location data from the location sensor; storing the underground infrastructure data in a data store; controlling, via a processor, the location of the apparatus by sending propulsion instructions to the propulsion system; and controlling, via the processor, delivery of the payload at a location of the underground infrastructure based, in part, on the location data and the underground infrastructure data.

In a further application, the present disclosure includes an autonomous marking system having a ground-penetrating detector arranged to detect underground infrastructure and generate underground infrastructure data therefrom. The ground-penetrating detector may be communicatively coupled to a data store. The data store may be arranged to receive and store the underground infrastructure data. The data store may be located at a remote server and/or a marking apparatus. The marking apparatus may include: a propulsion system arranged to position the marking apparatus; a location sensor arranged to determine the location of the marking apparatus; a payload assembly arranged to carry a payload of marking material; a transceiver arranged to exchange data between the marking apparatus and the data store; and a processor arranged to: i) receive location data from the location sensor, ii) receive the underground infrastructure data from the data store, iii) control the location of the marking apparatus by sending propulsion instructions to the propulsion system, and v) control the delivery of the payload at the location of the underground infrastructure based, in part, on the location data and underground infrastructure data.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which:

FIG. 6 includes a table showing various marking colors and their corresponding pigments;

DETAILED DESCRIPTION

The systems, methods, and devices described herein provide an autonomous marking system for the identification and application of utility markings within a geographic area. The autonomous marking system includes a location and/or depth sensor, a payload assembly, one or more marking sensors, a transceiver, a data store, and a processor. The location sensor is used to determine the location of the apparatus. The system may also include detection equipment that enables autonomous detection of certain underground infrastructure. The detection equipment may include a depth sensor (e.g., a sonar and/or electromagnetic detector) configured to determine the depth of the underground infrastructure. The payload assembly may be configured to carry a payload of marking material. For example, the payload assembly may carry a container of paint for marking the utility lines. The one or more marking sensors may be used to scan an area in proximity to the apparatus so that the apparatus can identify the utility markings. For example, one of the marking sensors can include an optical sensor that identifies paint and/or paint colors. The transceiver may be used to exchange data with a remote server via a data network. The data store may be used to store a portion of the data. In some embodiments, the processor receives data from all of the sensors (e.g., the location sensor, the one or more marking sensors, and from the transceiver) and uses the data to control the delivery of the payload (e.g., paint) at the location of the apparatus and/or location of underground infrastructure.

Figure 1:
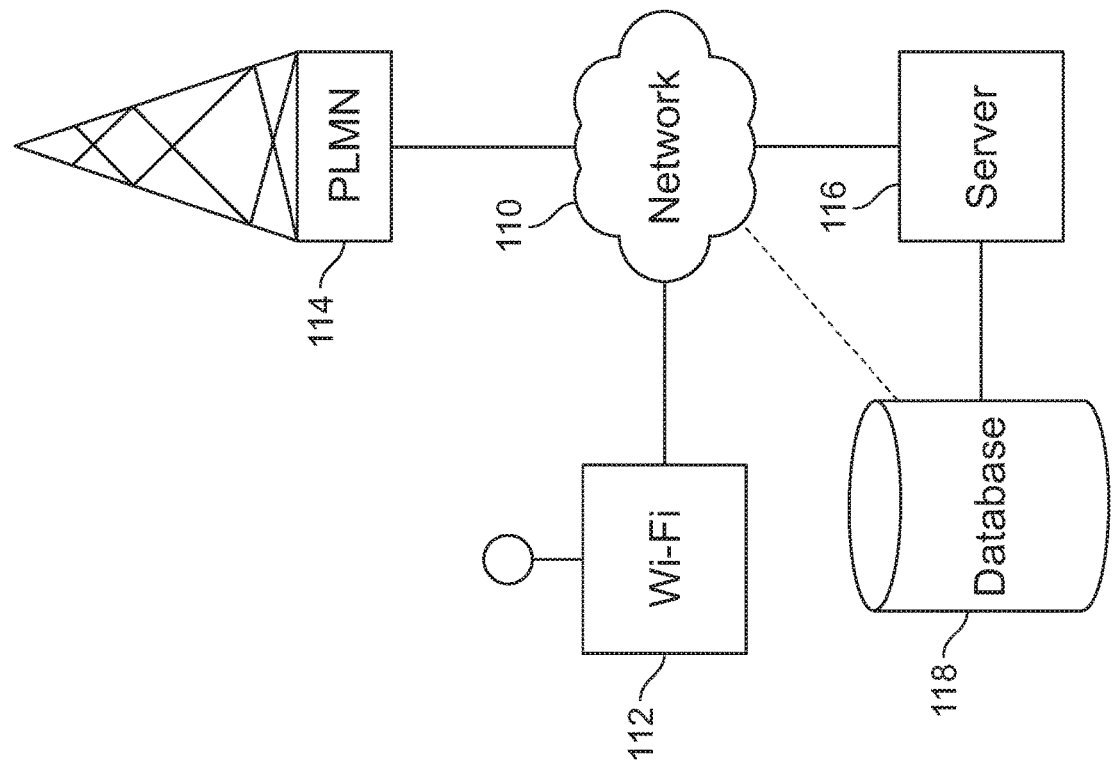
FIG. 1 shows a schematic representation of an autonomous marking system.
Figure 1:
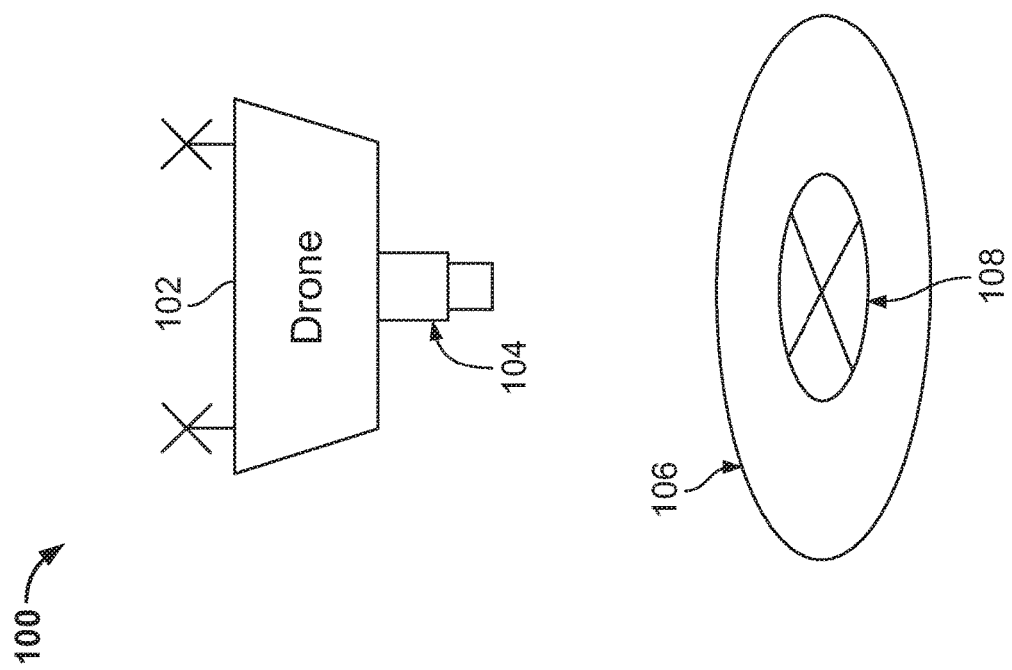

FIG. 1 shows a schematic representation of an autonomous marking system 100 comprising drone 102, network 110, Wi-Fi 112, public land mobile network (PLMN) 114, and server 116. Autonomous marking system 100 may include one or more drones 102. Each drone 102 may have a particular purpose. For example, one or more drones 102 may include sensors to identify utility lines and/or markings. Further, one or more drones 102 may include an applicator 104 (e.g., a spray nozzle) to mark the utility lines and/or markings identified by the same or another drone 102. Drone 102 is further described in the description of FIG. 2. As shown in FIG. 1, utility lines can be located at location 106 and identified by marking 108. Because utility lines are often several feet below the surface, markings 108 assist developers, utility workers, and homeowners in locating utility lines below the surface.

Network 110 represents a network of internet-based devices and connections such as servers, storage, and applications. Server 116 may be a server and the receiver of input data from drone 102, as well as data structures from network 110. Server 116 may also transmit signals and/or commands to drone 102. In one implementation, server 116 transmits signals to drone 102 to enable operation of applicator 104. Server 116 includes non-volatile storage that can maintain data for long periods of time and may comprise hard disks, optical disks, solid-state drives (SSDs), or another type of non-volatile memory. Server 116 may also include databases with accessible data structures that comprise information corresponding to locations of markings and utility lines. In one implementation, server 116 is communicatively coupled to external database 118 with accessible data structures that comprise information corresponding to locations of markings, types of markings, timestamps of marking creations, marking expiration data/time, and the like that correspond to certain infrastructure, such as utility lines. Server 116 may include a web server configured to receive inputs from entities using a user interface. Server 116 is further described in the description of FIG. 3, below. The database 118 may directly interface with server 116 and/or be included within a datastore of server 116. The database 118 may interface with server 116 and/or another other element of the marking system via data network 110. In some implementations, a portion of the data stored with datastore 118 may be stored within a memory and/or datastore of drone 102.

The communication between network 110 and drone 102 can be achieved using Wi-Fi 112 and/or PLMN 114. Wi-Fi 112 is implemented using a router that connects with drone 102 using a wireless local area network using IEEE 802.11 standards. Wi-Fi 112 may be located on or in a structure (e.g., a house or building) and allows drone 102 to communicate with network 110 within the range of the wireless local area network surrounding the structure. For example, drone 102 can be deployed from the roof of a building to location 106 if location 106 is within the range. In one implementation, Wi-Fi 112 may be located on a mobile structure (e.g., a van or truck) that allows drone 102 to communicate with network 110 within the range of the wireless local area network surrounding the mobile structure. For example, drone 102 can be deployed from a mobile structure that has been deployed near location 106. PLMN 114 is a wireless telecommunication system that allows drone 102 to communicate with network 110 from a larger range compared with Wi-Fi 112. In one configuration, PLMN 114 is implemented using a radio base station and radio transmitters and receivers. As described further below, drone 102 transmits and receives data from Wi-Fi 112 and/r PLMN 114 using an on-board transceiver.

Figure 2:
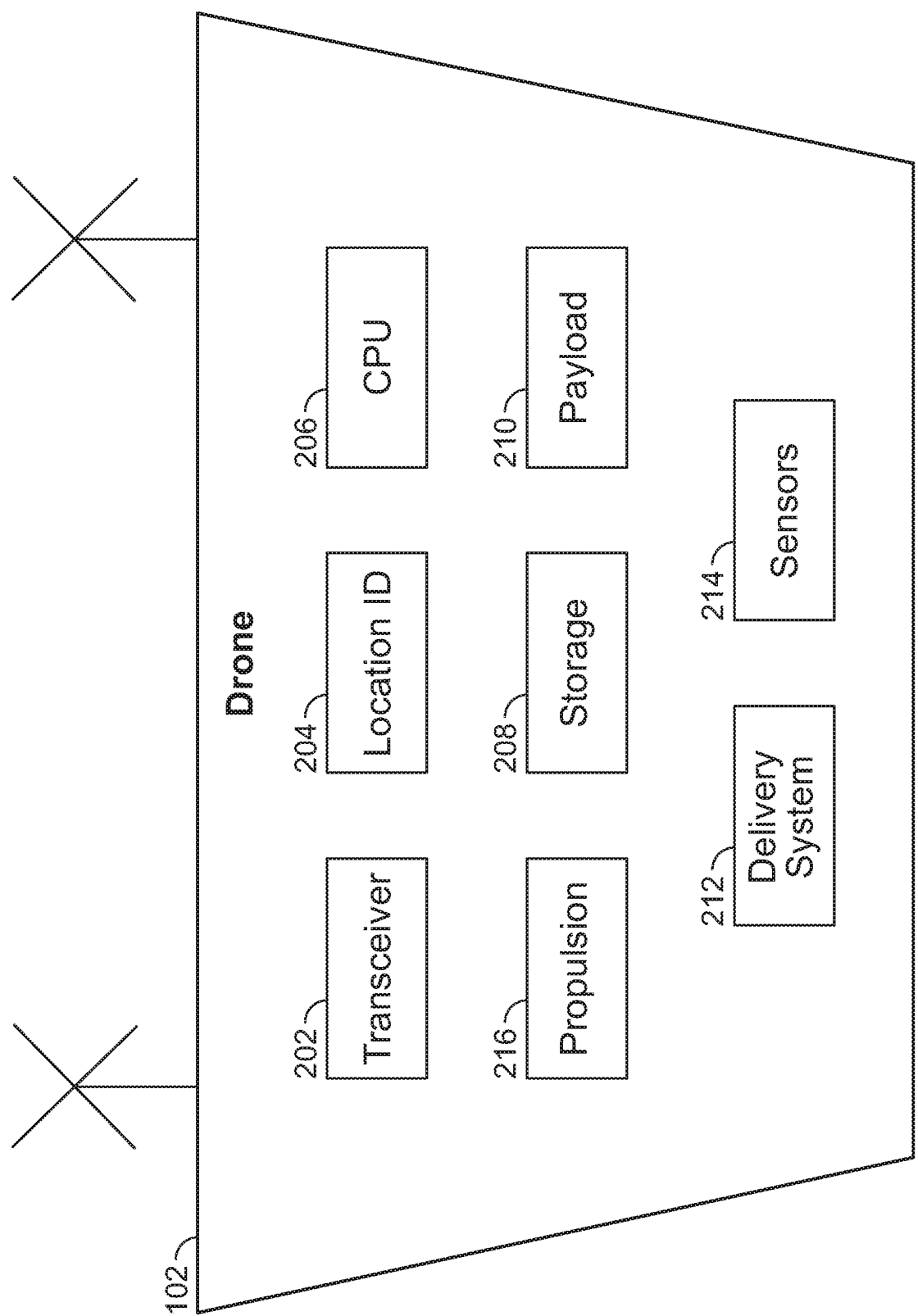
FIG. 2 shows a schematic representation of a drone of the autonomous marking system of FIG. 1.

FIG. 2 shows a schematic representation of a drone 102. Drone 102 comprises transceiver 202, location ID function 204, CPU (central processing unit) 206, storage 208, payload 210, and delivery system 212. Drone 102 may also include a memory unit (e.g., random-access memory), a display, speakers, a user input interface, and an output interface. CPU 206 may include a single microprocessor or multiple microprocessors. Storage 208 may be non-volatile storage that can maintain data for long period of time. Storage 208 may comprise hard disks, optical disks, SSDs, or another type of non-volatile memory.

Transceiver 202 may be a device having a transmitter and a receiver within a single housing or may include circuitry integrated within a server 116 and/or drone 102. Transceiver 202 is capable of transmitting and receiving radio signals. For example, transceiver 202 can transmit and receive data from Wi-Fi 112 and/or PLMN 114. CPU 206 may instruct transceiver 202 to receive data from network 110 and transmit data to network 110 via Wi-Fi 112 and/or PLMN 114. Location ID function 204 represents an identifier system that indicates the location of drone 102. For example, location ID function 204 may include a global positioning system (GPS) circuit or other navigational system using coordinates to keep track of the location of drone 102. Location ID function 204 may also keep track of the address of the nearest structure to use in combination with GPS coordinates. In one aspect, location ID function 204 may also include an accelerometer, telemetry sensor, radio-frequency sensor, and/or radio-frequency triangulation sensor.

Payload assembly 210 and delivery system 212 and/or applicator 104 enable drone 102 to identify utility markings (e.g., marking 108) and deploy a marking material on the utility markings. Payload assembly 210 may store material that is used to mark utility marking 108. In one aspect, the material in payload assembly or container 210 includes paint. Typically, utility lines are marked using paint along the length of the lines. The color of the paint identifies the type of utility that is being marked. For example, the American Public Works Association (APWA) has issued a uniform color code for marking underground utility lines. The APWA color code assigned red to electric power lines, yellow to gas lines, orange to communication lines, blue to potable water lines, and green to sewer lines, among others. In one implementation, payload assembly 210 is coupled to applicator 104 such that applicator 104 deploys the material in payload assembly 210 to a marking 108.

Delivery system 212 includes control circuitry to enable deployment of payload assembly 210. For example, CPU 206 may instruct delivery system 212 to open a hatch and/or valve of payload assembly 210, allowing the material of payload assembly 210 to move into applicator 104. Delivery system 212 also includes one or more sensors 214 to identify markings and/or utility lines. The sensors 214 may include one or more of optical sensors, visible light sensors, cameras, infrared sensors, ultra violet sensors, radiation sensors, and/or ground-penetrating sensors. A ground-penetrating sensor may include a sonar, magnetic, and/or electromagnetic sensor. The one or more sensors 214 of delivery system 212 may be configured to scan an area in proximity to the drone 212. For example, the sensors 214 may sense colors and/or compounds in paint. As described above, the color of a marking or a compound in the paint of marking 108 may be used to identify the type of utility line that is underneath marking 108.

In one implementation, sensors 214 may sense colors optically by calculating the hue and saturation of RGB (red, green, and blue) pixels of an image. For example, sensor 214 may capture an image of the area surrounding marking 108. Sensors 214 can calculate the hue and saturation of RGB pixels of the image of the marking 108 and compare the calculations to stored hue and saturation values representing known colors.

In another aspect, sensors 214 may sense colors using infrared spectroscopy to identify pigments in paint. For example, sensor 214 may emit an optical signal having a wavelength in the infrared range and measure the reflectance of light from the paint of marking 108. The reflectance will be different based on the pigment in the paint of marking 108. Sensor 214 can identify the specific pigment by comparing the spectrum of the reflectance with stored spectra of known pigments in paint. Once the pigment has been identified, sensor 214 can determine the color of the paint that corresponds to the identified pigment. Examples of pigments (and their corresponding colors) include carbon (black), cobalt aluminate (blue), chromium oxide (green), titanium dioxide (white), cobalt phosphate (violet), cadmium sulfide (yellow), cadmium sulfoselenide (orange), and iron oxide (red). Other examples of pigments include antimony trioxide (white), zinc oxide (white), cobalt stannate (blue), lead chromate (yellow), zinc chromate (yellow), and cadmium selenide (red).

In yet another aspect, sensors 214 may sense colors using radioluminescence. Radioluminescent paint is a self-luminous paint that consists of a small amount of a radioactive isotope and a radioluminescent phosphor chemical. The radioisotope continually decays, emitting radiation particles which strike molecules of the phosphor, exciting them to emit visible light. Generally, radioluminescent paint uses tritium as the radioactive isotope, but other radioactive isotopes may be used. As discussed above, sensors 214 may include a radiation detector to detect the radiation emitted by the radioactive isotope. In one implementation, sensors 214 may use RGB optical sensing and/or infrared spectroscopy to identify the color of the radioluminescent paint.

In some implementations, the drone 102 includes a propulsion system 216 that is configured to enable the drone 216 to move from one location to another location. The propulsion system 216 may enable to drone to remain stationary or hover in a particular location. The propulsion system may include one or more propellers, stabilizers, wheels, tracks, thrusters, batteries, and combustible engines. The CPU and/or controller 206 may control the propulsion system 216 to direct the drone 102 to a particular location or locations. The controller 206 may control the propulsion system 216 while concurrently controlling other components of the drone 102. For example, to draw one or more lines and/or markings, the controller may change the position of the drone 102 while actuating the delivery system 212 to delivery marking material, i.e., spray a surface. The controller 206 may also concurrently receive location data from the Location ID function 204 continuously so as to direct the position of the drone 102 along a desired path and/or to a desired location while also marking a target path and/or area.

Figure 3:
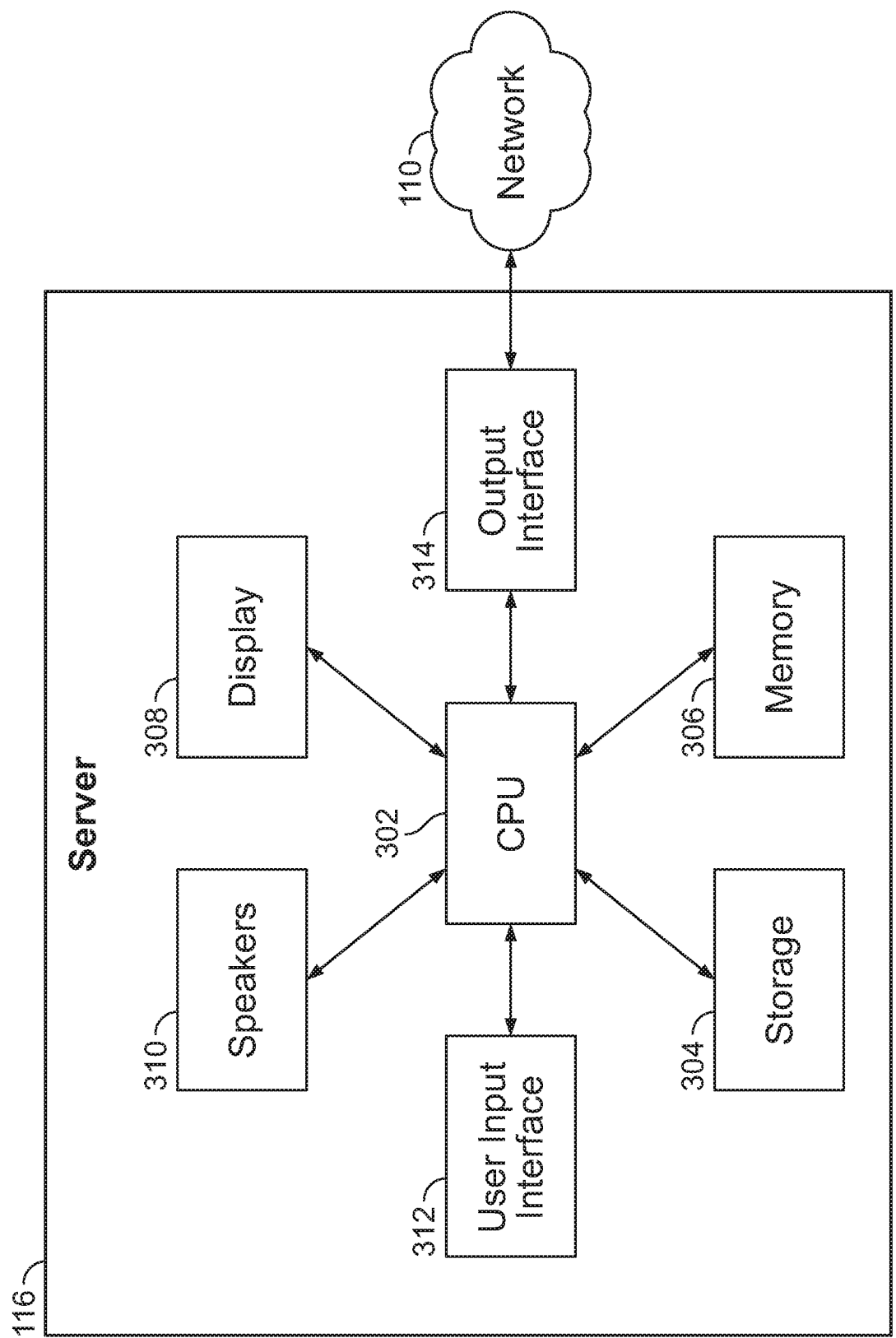
FIG. 3 shows a schematic representation of a server of the autonomous marking system of FIG. 1 interfacing with a network.

FIG. 3 shows a schematic representation of a system 300 including server 116 interfacing with network 110. In one aspect, system 300 also includes a Wi-Fi 112, PLMN 114, other wireless interface, and/or wired interface that interface with network 110. In another aspect, system 300 also comprises database 118 interfacing with server 116. Server 116 comprises CPU 302, storage 304, memory 306, display 308, speakers 310, user input interface 312, and output interface 314. CPU 302 may include a single microprocessor or multiple microprocessors. Storage 304 may be non-volatile storage that can maintain data for long period of time. Storage 304 may comprise hard disks, optical disks, SSDs, or another type of non-volatile memory. Memory 306 may be volatile storage that can be accessed quickly. Memory 306 may comprise dynamic random-access memory (DRAM), static random-access memory (SRAM), or another type of high-speed volatile memory.

Display 308 may be provided as a stand-alone device or integrated with server 116 and may comprise one or more of a monitor, a television, a liquid crystal display (LCD) for a mobile device, or any other suitable equipment for displaying visual images. Speakers 308 may be any suitable equipment for playing audio. User input interface 312 may comprise a keyboard, a mouse, a touch screen display, or any other suitable equipment for user input. Output interface 314 may comprise any suitable data communication device that can interface with network 110. System 300 may include a web client such as, without limitation, Google Chrome, Internet Explorer, and the like. The network 110 may include the Internet, an intranet, private data network, wireless network, mobile data network, satellite network, and the like.

Figure 4A:
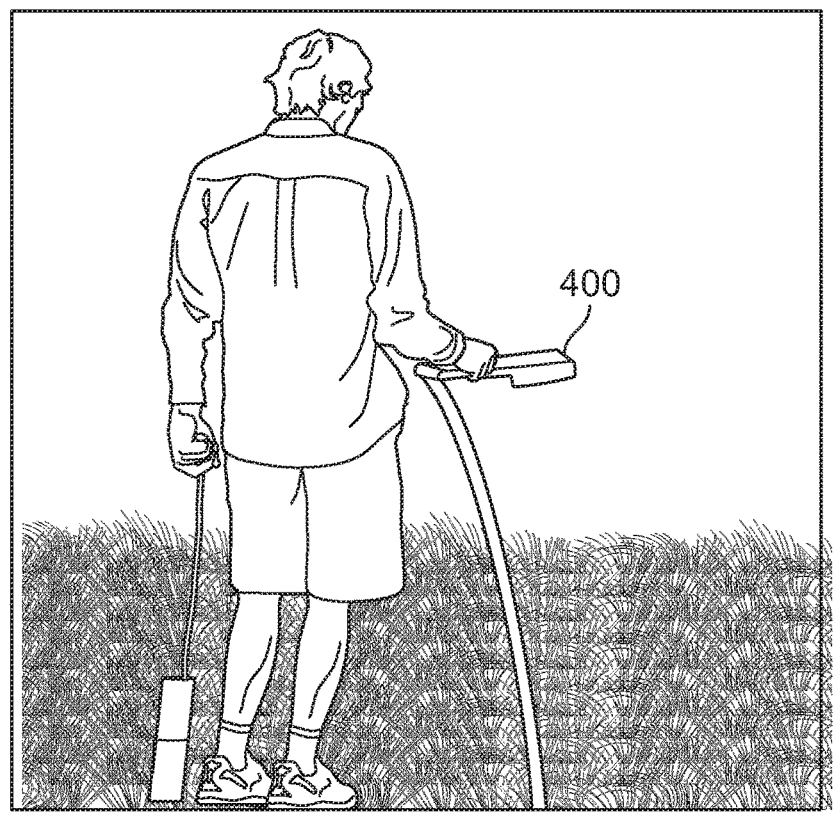
FIG. 4A shows a schematic representation of a marking identification system.
Figure 4B:
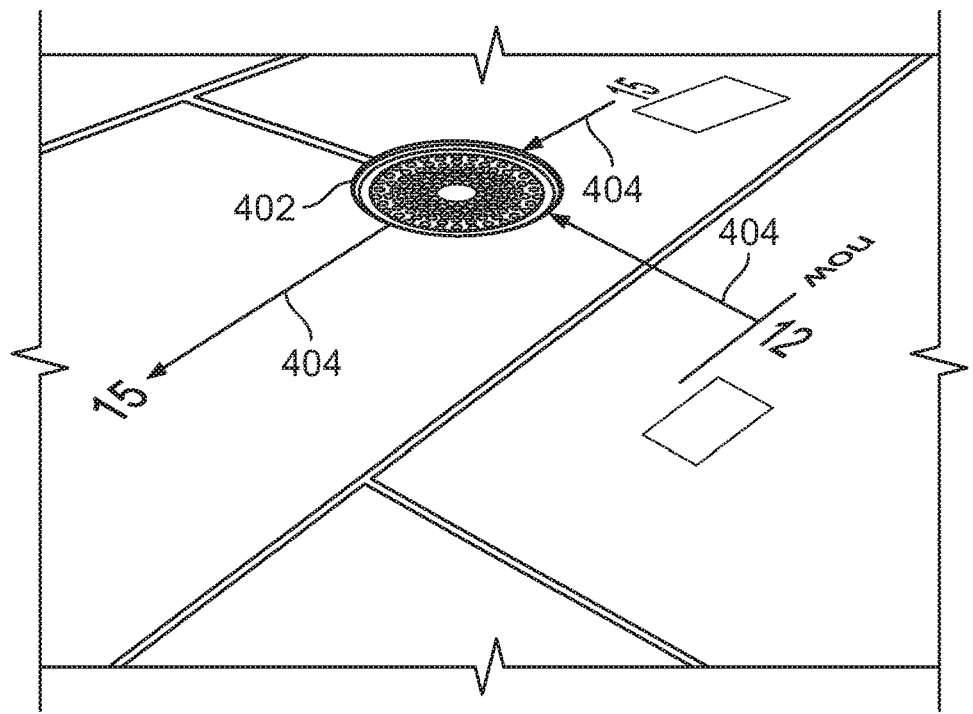
FIG. 4B shows another schematic representation of a utility marking.

As shown in FIG. 4A, utility companies deploy contractors to detect and identify the location 106 and depth of the utility lines using a utility locator tool 400. After detection and identification, the utility lines are marked with a marking (e.g., paint). An example of a marking 108 of potable water lines is shown in FIG. 4B. Although the color is not shown in FIG. 4B, the marking arrows 404 pointing toward and away from the water utility cover 402 use blue paint to indicate potable water lines below ground and their direction. However, when utility lines need to be marked across a large area (e.g., along a highway), traditional human marking of the utility lines can be onerous. Autonomous marking system 100 facilitates marking of utility lines by deploying drones 102 to identify and mark utility lines at a location 106.

Figure 5:
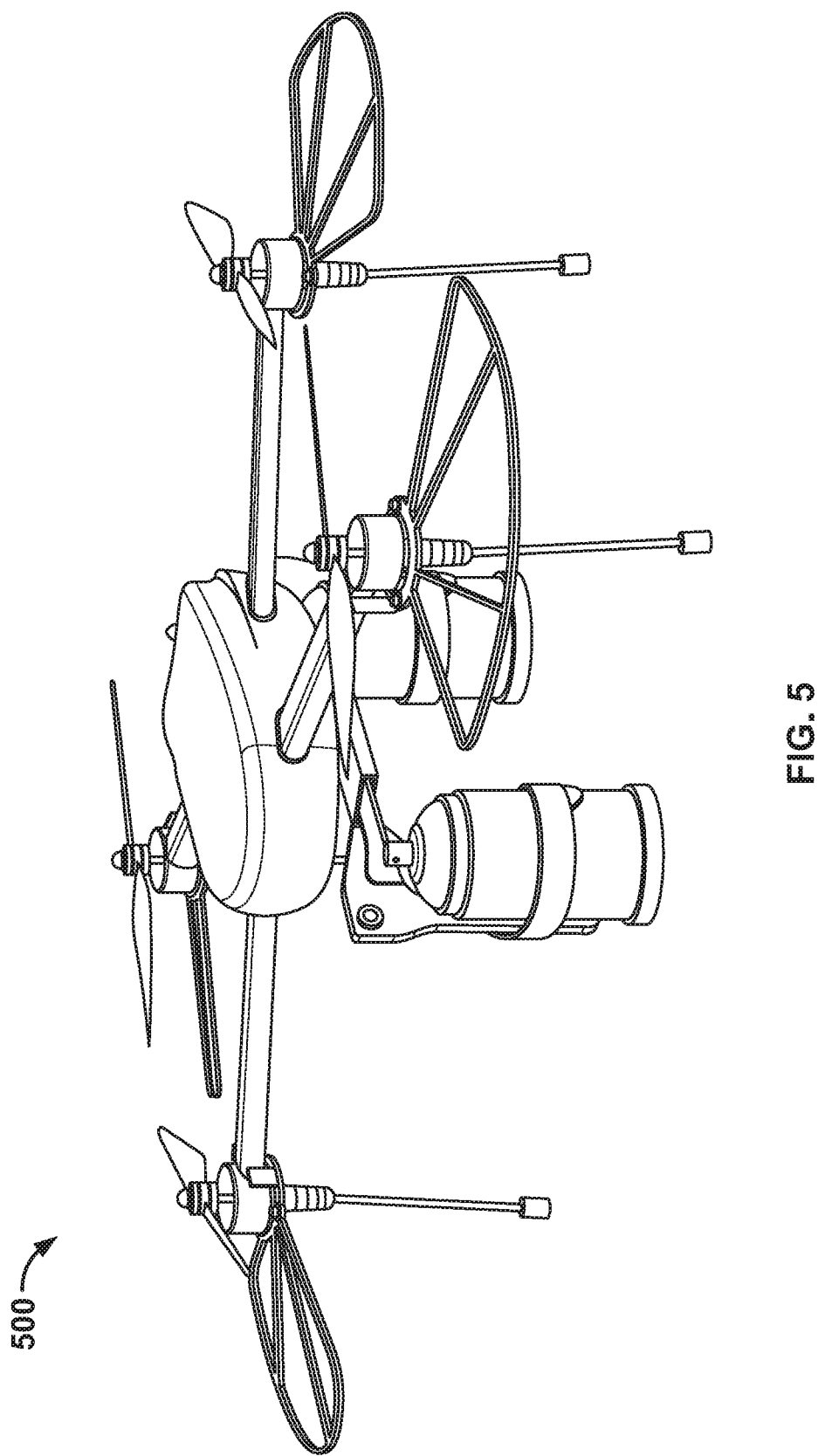
FIG. 5 shows another representation of a drone of the autonomous marking system of FIG. 1.

FIG. 5 illustrates another implementation of a drone 102 that can be used to assist human marking of utility lines. FIG. 6 includes a table 600 that shows various marking colors in column 602 and their corresponding pigment materials in column 604.

Figure 7:
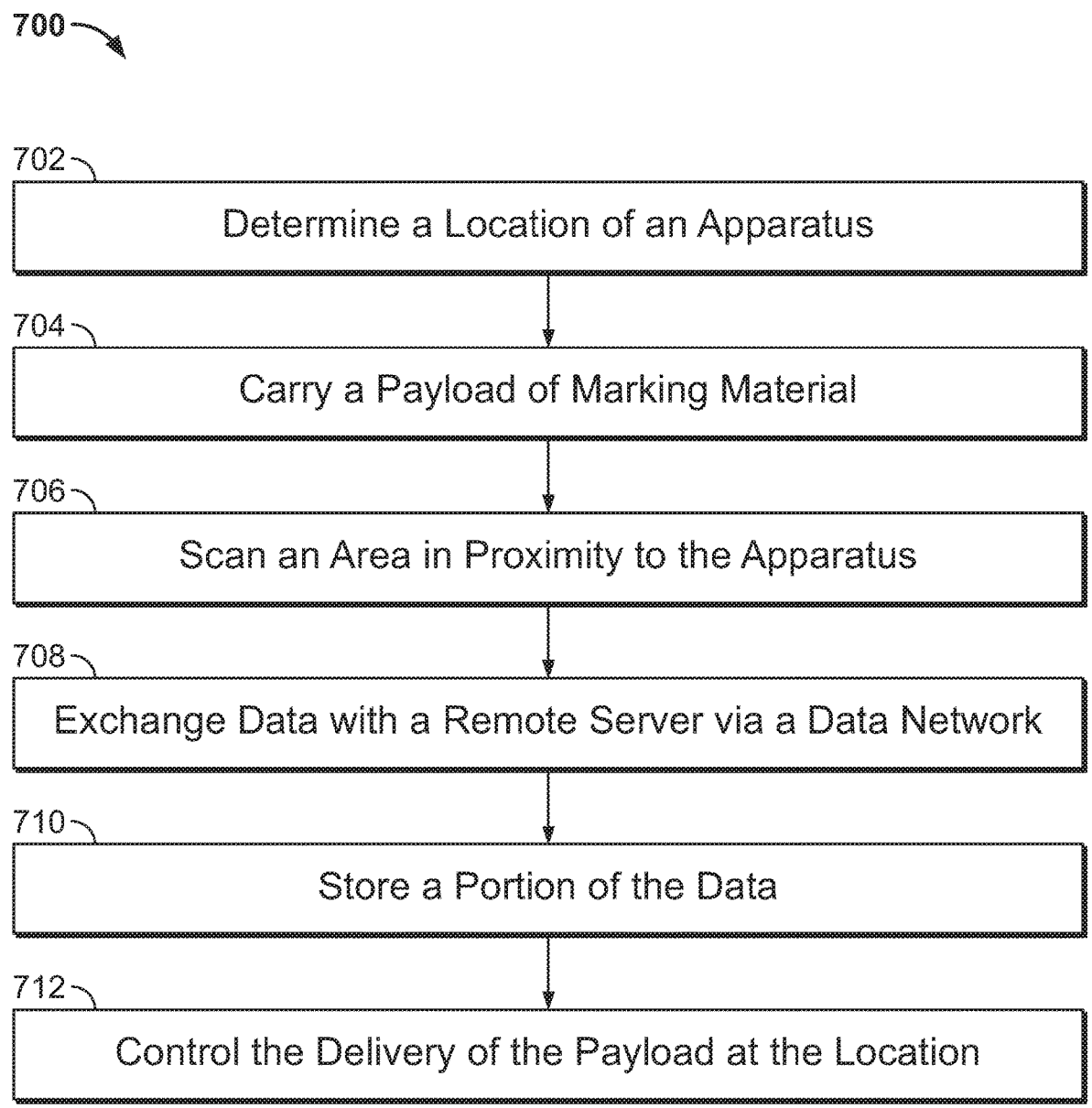
FIG. 7 is a flow diagram of method steps for deploying markings using the autonomous marking system of FIG. 1.

FIG. 7 is a flow diagram of a process 700 for deploying markings using the autonomous marking system of FIG. 1. The process 700 begins by determining a location of an apparatus. (Step 702). The apparatus may be a robot, a drone 102, unmanned aerial vehicle (UAV), or autonomous aerial vehicle (AAV). For example, location ID function 204 of drone 102 can determine the location 106 of drone 102. Location ID function 204 may include a GPS system using coordinates to keep track of the location of drone 102. Location ID function 204 may also keep track of the address of the nearest structure to use in combination with the GPS coordinates. In one aspect, location ID 204 function may also include an accelerometer, telemetry sensor, radio-frequency sensor, and radio-frequency triangulation sensor.

Process 700 continues by carrying a payload of marking material (Step 704). For example, payload assembly 210 of drone 102 can carry marking material. The marking material may include paint, flags, electronic beacons, and/or marking structures. In one aspect, the marking material may include optically-identifiably elements. For example, the paint in payload assembly 210 can include a pigment or compound that is identifiable by a sensor of drone 102. As discussed above in relation to FIG. 2 and as illustrated in FIG. 6, examples of pigments (and their corresponding colors) include carbon (black), cobalt aluminate (blue), chromium oxide (green), titanium dioxide (white), cobalt phosphate (violet), cadmium sulfide (yellow), cadmium sulfoselenide (orange), and iron oxide (red). Other examples of pigments include antimony trioxide (white), zinc oxide (white), cobalt stannate (blue), lead chromate (yellow), zinc chromate (yellow), and cadmium selenide (red). In one aspect, the paint includes a radioactive isotope such as tritium.

Process 700 continues by scanning an area in proximity to the apparatus. (Step 706). For example, delivery system 212 can include marking sensors configured to scan an area at location 106. The marking sensors 218 may include optical sensors, visible light sensors, cameras, infrared sensors, ultraviolet sensors, and/or radiation sensors. For example, sensor 214 may emit an optical signal having a wavelength in the infrared range and measure the reflectance of light from the paint of marking 108. The reflectance will be different based on the pigment in the paint of marking 108. Sensor 214 can identify the specific pigment by comparing the spectrum of the reflectance with stored spectra of known pigments in paint. Once the pigment has been identified, sensor 214 can determine the color of the paint that corresponds to the identified pigment. In one aspect, sensor 214 may capture an image of the area surrounding marking 108. Sensors 214 can calculate the hue and saturation of RGB pixels of the image of the marking 108 and compare the calculations to stored hue and saturation values representing known colors in, for example, table 600. In some instances, a drone 102 may survey an area using an underground infrastructure sensor and/or ground-penetrating sensor to determine the location and/or depth of underground infrastructure, and apply one or more markings to the surface above such infrastructure via, for example, applicator 104. In other instances, a drone 102 may survey the surface of an area to confirm and/or identify the location of certain underground infrastructure using, for example, sensors 208 to detect existing markings. In yet other instances, a drone 102 may scan for marking and scan for underground infrastructure concurrently. In a further instance, a drone 102 may be directed to particular location by, for example, server 116, sending location data and instructions to the drone 102 to deliver a particular type of payload (e.g., yellow paint associated with a gas line) at that location. Once the payload is delivered, the drone 102 may send data back to server 116 indicating completion of the payload delivery so that a status associated with the underground infrastructure is updated in a marking database. In some configurations, the underground infrastructure scanner may be detached from and/or not connected to the drone 102 but communicatively coupled to the drone 102 via a wireless interface to enable detection, location, and/or depth data to be delivered to the drone 102.

Process 700 continues by exchanging data with a remote server via a data network. (Step 708). For example, transceiver 202 of drone 102 can exchange data with server 116 via network 110. The data network can be a wireless data network such as a mobile telephone network, a Wi-Fi network, local area network, wide area network, the Internet, a Bluetooth network, and other wireless network. The mobile telephone network can be implemented using PLMN 114. The Wi-Fi network and/or local area network can be implemented using Wi-Fi 112. The data exchanged between a drone 102 and server 116 may include, for example, underground infrastructure data such as underground infrastructure location and/or depth data, among other data related to the underground infrastructure described herein.

In one aspect, CPU 206 and/or transceiver 202 of drone 102 can exchange data with a ground-penetrating sensor. As shown in FIG. 4A, ground-penetrating sensors can be used to detect and identify the location 106 and depth of the utility lines. The ground-penetrating sensor can collect underground infrastructure data that can be used by drone 102 to identify markings 108. The ground-penetrating sensor may include a depth sensor. The ground-penetrating sensor may be detached from or integrated within the drone 102. A detached ground-penetrating sensor may communicate and/or exchange detection data with a drone 102 via a wireless interface either directly via, for example, Bluetooth, Wifi, or another wireless protocol or indirectly via a PLMN network, Wifi, or other wireless network. A detached ground-penetrating sensor and/or detector system may send its detected underground infrastructure data to a server 116 and/or database 118 for subsequent delivery to a drone 102 which, in turn, may be used to direct the drone 102 to underground infrastructure to effect marking on a surface above the underground infrastructure. The detection data and/or underground infrastructure data may include, without limitation, location, time and/or date, depth, type of infrastructure, address, project ID, an infrastructure element ID, survey ID, surveyor ID and/or name, and so on.

Process 700 continues by storing a portion of the data in a data store. (Step 710). For example, storage 208 of drone 102 can store underground infrastructure data that can be used by drone 102 to identify markings 108. In one aspect, storage 208 can receive and store location data from location ID function 204. For example, the location data can include the GPS coordinates of location 106. Location 106 may be associated with an underground infrastructure such as a water pipe, a gas pipe, an electrical cable, a fiber optic cable, a communication cable, a liquid pipe, a structure, a tunnel, an electrical unit, or an electronics unit.

Process 700 further includes controlling the delivery of the payload at the location. (Step 712). For example, CPU 206 of drone 102 can be configured to receive data from location ID 204, delivery system 212, and transceiver 202. CPU 206 can use the received data to control the delivery of the payload assembly 210 at location 106. For example, CPU 206 may instruct delivery system 212 to open an access to payload assembly 210, allowing a portion of the material of payload assembly 210 to move into applicator 104, if drone 102 is in a position above marking 108. In some aspects, the delivery system 212 includes spray nozzles, spread head, pneumatic dispensers, mechanical dispensers, and/or electronic dispensers. While the examples herein primarily describe delivery of paint, a payload assembly 210 may include, for example, one or more pylons that can be deployed to a location such as a road to redirect traffic or block access to a particular area.

In one aspect, the CPU 206 of drone 102 is configured to process the underground infrastructure data received from the ground-penetrating sensor and location data received from location ID function 204 and store a table including correlated underground infrastructure and location data in storage 208. In another aspect, CPU 206 may transmit the table to server 116 via network 110. The server 116 may store the table in database 118 for future use by another drone 102.

Figure 8:
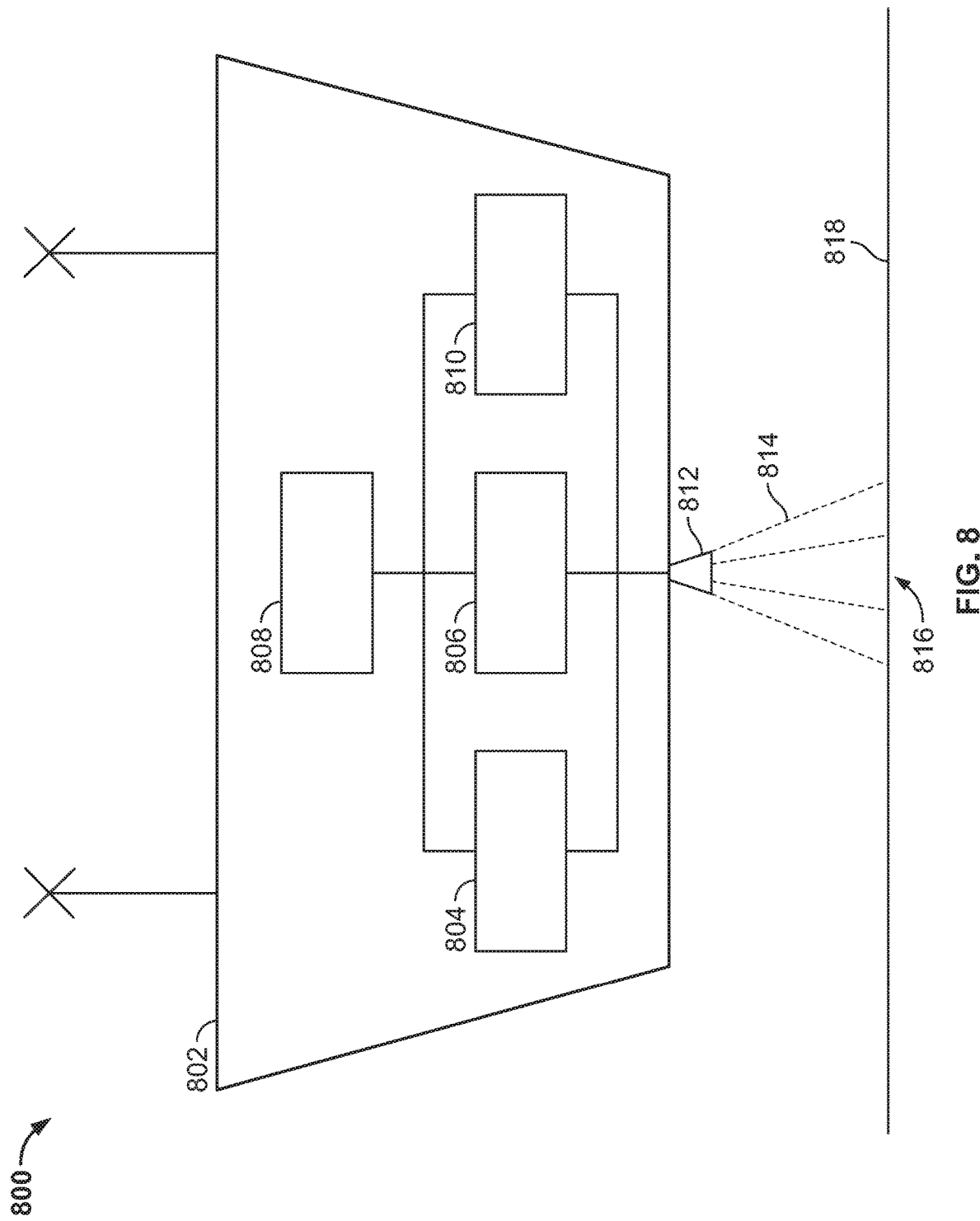
FIG. 8 illustrates a drone spraying a target area with marking material.

FIG. 8 illustrates a marking system 800 including a drone 802 spraying a target area 816 on a surface 818 with marking material 814 via a nozzle and/or applicator 812. The drone 802 may include one or more payload containers and/or assemblies 804, 806, and 810. The drone 802, via a controller such as controller and/or CPU 206, may selectively deploy one or more types of marking material by storing different marking materials in each payload container 804, 806, and 810, and then selecting one of the containers to deliver its payload of marking material to the nozzle 812 to spray the material onto the target area 816. The controller 206 may control one or more electromechanically actuated delivery valves to effect delivery of the selected marking material to the target area 816. For example, payload container 804 may store yellow paint, payload container 806 may store blue paint, and payload container 810 may store green paint. In some implementations, one or more payload containers includes an aerosol can or other type of detachably removable container.

Each payload container 804, 806, and 810 may be independently pressurized. In some implementations, drone 802 may include a pressurizer 808 that is selectively connected to each payload container 804, 806, and 810 when a payload is to be delivered from the selected payload container. When drone 802 detects a gas line (and/or is directed by CPU 206 to a location of a gas line), the controller 206 may open a valve outlet from payload 804 and open nozzle 812, while closing valve outlets from payloads 806 and 810 to deliver the yellow paint to the target area 816. The drone 802, under the control of CPU 206, may move along a path or from a first position to a second position to draw one or more lines on the surface 818 corresponding to a location and/or direction of the underground gas line. The drone 802 may mark a potable water line using the blue paint stored in container 808 by controlling the delivery valves accordingly. The drone 802 may mark a sewer line using the green paint by controlling the delivery valves accordingly. In some configurations, an angle and/or orientation of the nozzle 812 is controlled by controller 206 to enable delivery of markings to a surface that may not be substantially perpendicular to the drone 802. Also, the controller 206 may control delivery of marking material for at least a portion of a marking without having to move the drone 802. Instead, a portion of a marking may be delivered by adjusting an orientation and/or angle of the nozzle 812 with respect to the surface 818 and/or the drone 802 For example, an arrow head of a marking may be drawn on a surface by manipulating the nozzle 812 instead of moving the drone 802.

Figure 9:
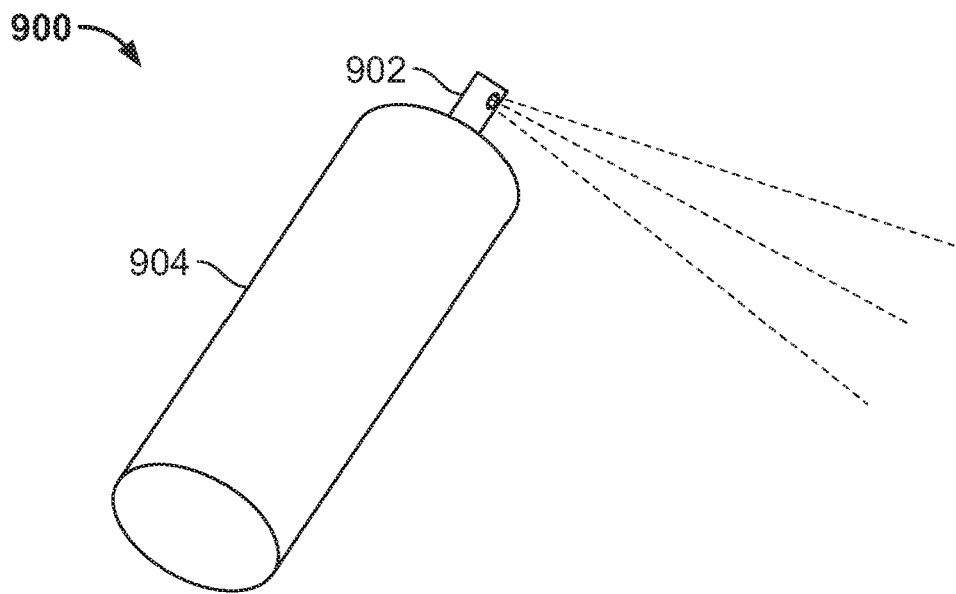
FIG. 9 shows a perspective view of an aerosol can including marking material.

FIG. 9 shows a perspective view of an aerosol can 900 including marking material. The can 900 may include a housing or storage container 904 and a spray nozzle 902. The housing 904 may be pressurized to enable marking material, e.g., paint, to be expelled from the housing 904 when the valve of the nozzle 902 is opened.

Figure 10:
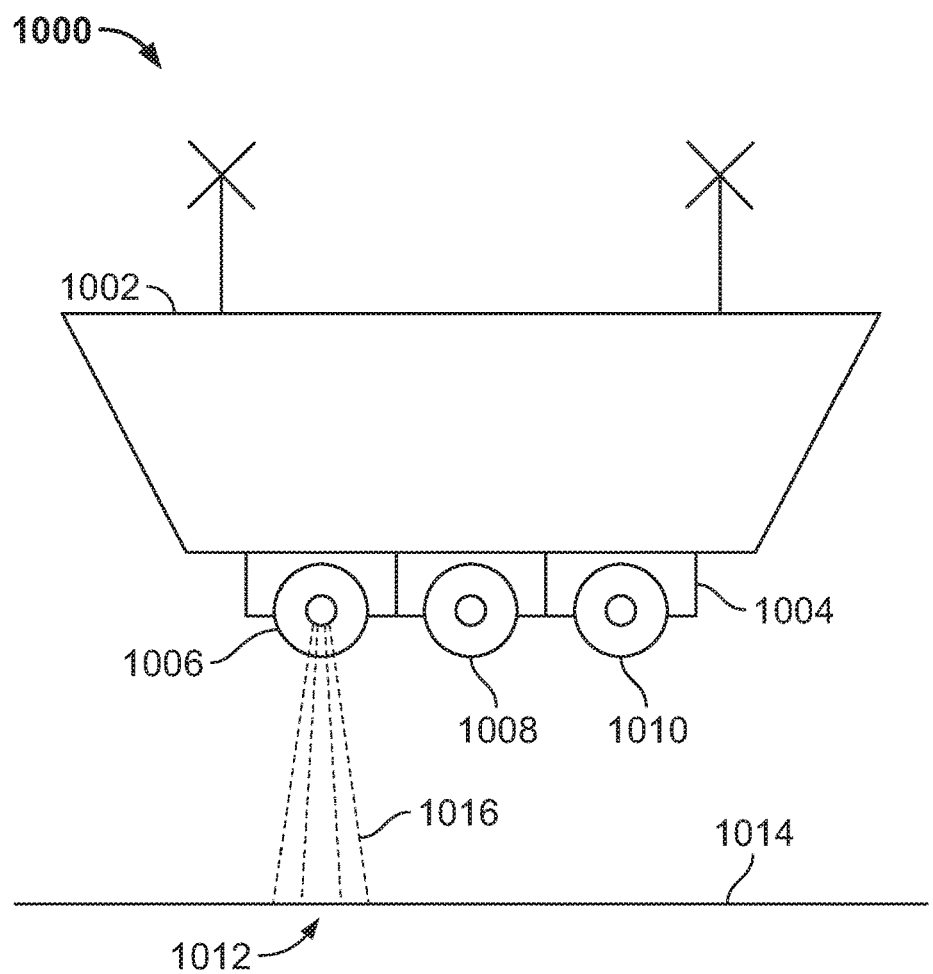
FIG. 10 illustrates a drone deploying a marking to a target area while holding multiple detachably connectable aerosol cans.

FIG. 10 illustrates a marking system 1000 including a drone 1002 deploying marking material 1016 to a target area 1012 on a surface 1014 while holding multiple detachably connectable aerosol cans 1006, 1008, and 1010. In some implementations, the drone 1002 includes a payload assembly 1004 that is configured to detachably hold one or more marking payloads such as, for example, aerosol cans 1006, 1008, and 1010. The payload assembly 1004 may include one or more mechanical, magnetic, electromechanical, and/or electromagnetic connectors that facilitate physical connection of aerosol cans 1006, 1008, and 1010 to the assembly 1004. The payload assembly may include one or more electromechanical switches and/or actuators that are configured to engage the nozzle 902 of an aerosol can 1006, 1008, and 1010 to initiate delivery of marking material 1016 to the target area 1012. In some implementations, the payload assembly 1004 includes one or more receptacles configured to engage with an aerosol tube extending from an aerosol can. For example, in some configurations, the nozzle 902 may be removed from an aerosol can 1006, 1008, and 1010 so that the remaining spray tube can engage with a female receptacle of the valve assembly 1004. The valve assembly 1004 may include one or more control valves that are electromechanically controlled by controller 206 to selectively initiate marking delivery to a target area 1012.

Other objects, advantages and implementations of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

What is claimed is:

1. An autonomous marking apparatus comprising:
a transceiver communicatively coupled to at least one of a data network and a ground-penetrating sensor, the transceiver arranged to receive underground infrastructure data, the underground infrastructure data including location and type data associated with underground infrastructure;
a propulsion system arranged to position the marking apparatus;
a location sensor arranged to determine the location of the apparatus;
a payload assembly arranged to carry a payload of marking material;
a data store arranged to store the underground infrastructure data; and
a processor arranged to: i) receive apparatus location data from the location sensor, ii) receive the underground infrastructure data from the data store, iii) control the location of the apparatus by sending propulsion instructions to the propulsion system, and v) control the delivery of the payload on a ground surface above at the location of the underground infrastructure based, in part, on the apparatus location data and the underground infrastructure data, wherein the payload includes an indicator of the type of underground infrastructure.

2. The apparatus of claim 1, wherein the apparatus is one or more of a robot, drone, unmanned aerial vehicle (UAV), and an autonomous aerial vehicle (AAV).

3. The apparatus of claim 1, wherein the marking material includes one or more of paint, flags, electronic beacons, and marking structures.

4. The apparatus of claim 3, wherein the payload includes one or more optically-identifiable elements.

5. The apparatus of claim 1 comprising one or more marking sensors arranged to scan an area in proximity to the apparatus, wherein the one or more marking sensors include one or more of optical sensors, visible light sensors, cameras, infrared sensors, ultra violet sensors, and radiation sensors.

6. The apparatus of claim 1, wherein the location sensor includes at least one of a GPS sensor, an accelerometer, telemetry sensor, radio-frequency sensor, and radio-frequency triangulation sensor.

7. The apparatus of claim 1, wherein the ground-penetrating sensor is detached from the apparatus.

8. The apparatus of claim 1, wherein the underground infrastructure includes at least one of a water pipe, a gas pipe, an electrical cable, a fiber optic cable, a communication cable, a liquid pipe, a structure, a tunnel, an electrical unit, and an electronics unit.

9. The apparatus of claim 1, wherein the data network includes a wireless data network.

10. The apparatus of claim 9, wherein the wireless data network includes at least one of a mobile telephone network, a Wi-Fi network, local area network, wide area network, the Internet, a Bluetooth network, and other wireless network.

11. The apparatus of claim 1, wherein the transceiver is further configured to exchange underground infrastructure data with the ground-penetrating sensor.

12. The apparatus of claim 11, wherein the processor is arranged to process the underground infrastructure data and location data from the location sensor and store a table including correlated underground infrastructure and location data in the data store.

13. The apparatus of claim 1 comprising a payload delivery unit arrange to deploy a portion of the payload in response to an instruction from the processor.

14. The apparatus of claim 13, wherein the payload delivery unit includes at least one or more of spray nozzles, pneumatic dispensers, mechanical dispensers, and electronic dispensers.

15. The apparatus of claim 1, wherein the processor controls the location of the apparatus by sending propulsion instructions to the propulsion system in response to the apparatus location data received from the location sensor.

16. A method for autonomous marking comprising:
communicatively coupling a marking apparatus to at least one of a data network and a ground-penetrating sensor;
receiving underground infrastructure data from the at least one of the data network and the ground-penetrating sensor, wherein the underground infrastructure data includes location and type data associated with underground infrastructure;
positioning a marking apparatus using a propulsion system;
determining a location of the apparatus via a location sensor;
receiving location data from the location sensor;
storing the underground infrastructure data in a data store;
controlling, via a processor, the location of the apparatus by sending propulsion instructions to the propulsion system; and
controlling, via the processor, delivery of the payload onto a ground surface above a location of the underground infrastructure based, in part, on the location data and the underground infrastructure data, wherein the payload includes an indicator of the type of underground infrastructure.

17. The method of claim 16, wherein the location sensor includes at least one of a GPS sensor, an accelerometer, telemetry sensor, radio-frequency sensor, and radio-frequency triangulation sensor.

18. The method of claim 16, wherein the ground-penetrating sensor is detached from the apparatus.

19. The method of claim 16, wherein the underground infrastructure includes at least one of a water pipe, a gas pipe, an electrical cable, a fiber optic cable, a communication cable, a liquid pipe, a structure, a tunnel, an electrical unit, and an electronics unit.

20. An autonomous marking system comprising:
a ground-penetrating detector arranged to detect underground infrastructure and generate underground infrastructure data therefrom, the ground-penetrating detector being communicatively coupled to a data store;
the data store arranged to receive and store the underground infrastructure data, the data store being located in at least one of a remote server and a marking apparatus; and
the marking apparatus including:
a propulsion system arranged to position the marking apparatus;
a location sensor arranged to determine the location of the marking apparatus;
a payload assembly arranged to carry a payload of marking material;
a transceiver arranged to exchange data between the marking apparatus and the data store; and
a processor arranged to: i) receive location data from the location sensor, ii) receive the underground infrastructure data from the data store, iii) control the location of the marking apparatus by sending propulsion instructions to the propulsion system, and v) control the delivery of the payload onto a ground surface above the location of the underground infrastructure based, in part, on the location data and underground infrastructure data, wherein the payload includes an indicator of the type of underground infrastructure.

* * * * *